United States Patent [19]

Vierkötter et al.

[11] Patent Number: 4,541,551

[45] Date of Patent: Sep. 17, 1985

[54] SEALING TOP FOR CONTAINERS FOR POWDERED OR GRANULAR MATERIALS

[75] Inventors: Peter Vierkötter, Leverkusen; Erich Türk, Langenfeld; Bernd-Dieter Holdt; Ronald Menke, both of Düsseldorf, all of Fed. Rep. of Germany

[73] Assignee: Henkel Kommanditgesellschaft auf Aktien, Düsseldorf-Holthausen, Fed. Rep. of Germany

[21] Appl. No.: 303,840

[22] Filed: Sep. 21, 1981

Related U.S. Application Data

[63] Continuation of Ser. No. 1,459, Jan. 8, 1979, abandoned.

[30] Foreign Application Priority Data

Jan. 13, 1978 [DE] Fed. Rep. of Germany ....... 2801327

[51] Int. Cl.4 .............................................. G01F 11/26

[52] U.S. Cl. .................................... 222/456; 222/561

[58] Field of Search ............... 222/547, 212, 211, 215, 222/545, 559, 561, 633, 644, 454, 455, 456, 424.5, 564, 566; 239/590

[56] References Cited

U.S. PATENT DOCUMENTS

| | | | |
|---|---|---|---|
| 2,099,289 | 11/1937 | Anderson | 222/561 |
| 2,387,724 | 10/1945 | Elman et al. | 222/561 |
| 2,555,459 | 6/1951 | Seufer | 222/561 |
| 2,678,754 | 5/1954 | Kirsner | 222/561 |
| 2,927,717 | 3/1960 | McDermott | 222/561 |
| 3,409,189 | 11/1968 | McKeand, Jr. | 222/561 |
| 3,731,855 | 5/1973 | Vos | 222/561 |
| 4,401,272 | 8/1983 | Merton et al. | 222/547 |

*Primary Examiner*—Joseph J. Rolla
*Assistant Examiner*—Kenneth Noland
*Attorney, Agent, or Firm*—Hammond & Littell, Weissenberger & Dippert

[57] ABSTRACT

A sealing top for containers for powdered or granular materials which permits controlled discharge of the container contents without clogging and which is provided with a valved opening by which the sealing top may be opened and closed.

6 Claims, 3 Drawing Figures

SEALING TOP FOR CONTAINERS FOR POWDERED OR GRANULAR MATERIALS

Figure 1:
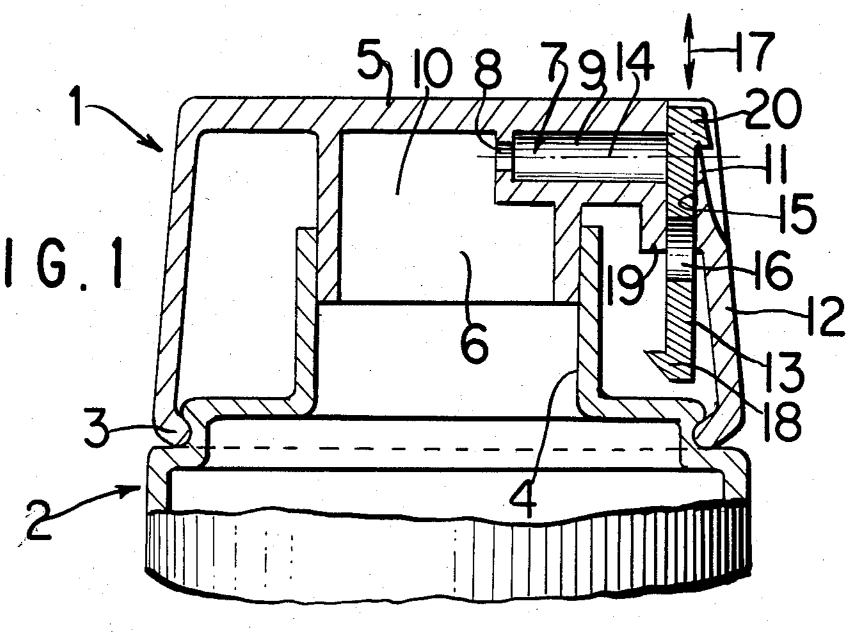

This is a continuation of co-pending U.S. patent application Ser. No. 1,459, filed Jan. 8, 1979 now abandoned.

BACKGROUND OF THE INVENTION

Conventional packings, e.g. containers from which powders are removed by pressure put on a flexible packing container, are equipped with seals which unblock openings for removing the containers contents by rotating a slide cover or pulling up a hinged lid. With such sealing devices however, powders cannot be applied in a directional fashion because these devices release the powder only as a stream with all round dispersion.

OBJECTS OF THE INVENTION

One of the objects of this invention is to provide a seal for this type container by which a directional powder stream can be produced, which can be target applied on a surface.

Another object of this invention is to insure trouble-free removal from the container without blockage of the container opening by the powder or granular material therein.

Another object is to provide a seal having a graded outlet channel having the inner portion, facing the interior of the container, smaller than the outer portion from which the contents of the container are discharged.

Another object of this invention is to provide such container seal with a slide valve by which the contents of the container may be discharged and the said discharge cleanly cut off when the desired amount of the container contents has been discharged.

THE INVENTION

According to the invention the prior art problems of direction discharge and clean discharge cut off are solved by providing as the opening of the seal a graded outlet channel with an inner channel facing the container's interior and an outer channel extending outward from the inner channel, and by providing the inner channel with a cross-sectional area of smaller than that of the other channel.

The outlet channel of the seal is provided with a gradually enlarging discharge of opening in which the inside cross-sectional area is smaller than the outwardly facing one. This prevents arching and clogging of the container opening by the powders or granular material in the containers during removal of the container contents. The seal of this invention then operates obstruction-free.

This gradually enlarging outlet channel permits discharge a directional powder stream from the channel when the channel is open, by compressing the flexible container, which facilities a targeted application of the container contents. To align the powder stream the length of the inner channel is kept maximally short by comparison with the outer channel length, by providing an outer channel cross-section-to-length ratio of at least 3:4.

The channel opening in the seal of this invention is preferably on the side of the container with a slider valve locking the channel opening arranged vertically.

The slider valve has an opening which corresponds with the cross-sectional area of the outer channel opening and is supported so that on opening, the passage hole of the slider valve registers with the clear opening of the outer channel and on closure any residues remaining in the discharge channel are returned to the seal interior. This is of particular advantage, with corroding products which might otherwise be spilled in undesired places. The slider valve is movably supported in a slider bearing provided on the outside of the outer discharge channel. Preferably at least one cam for the slider valve is provided to insure against loss of the slider valve at one or both the slider valve ends. One cam can then serve as limit stop on opening the slider valve.

Figure 2:
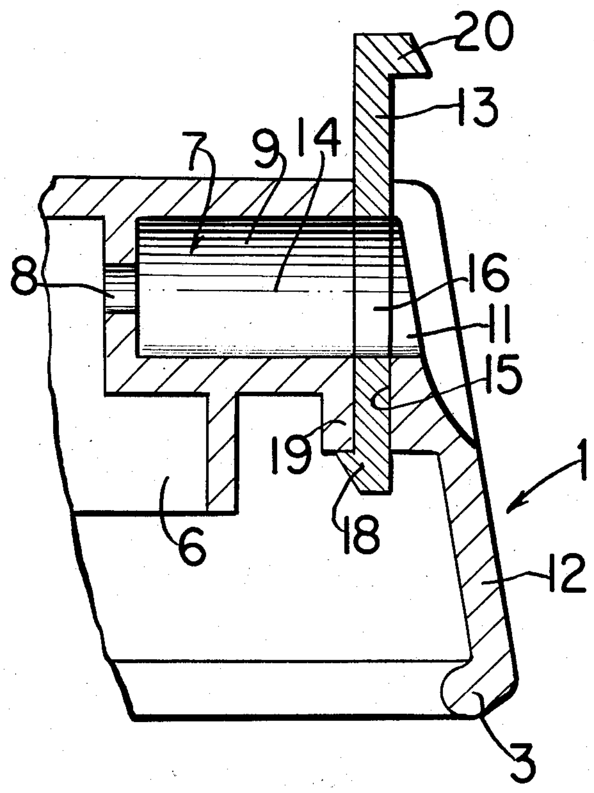
Figure 3:
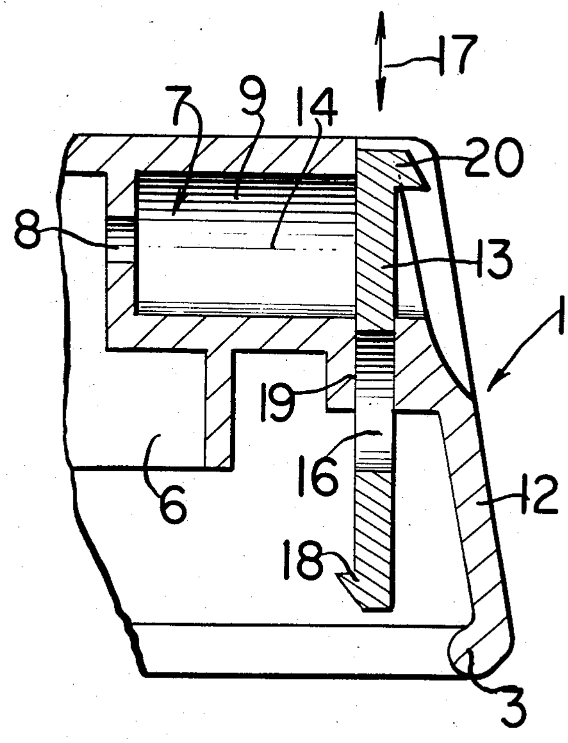

Further details of the construction are explained with reference to the schematized drawing of an exemplified embodiment, wherein:

FIG. 1 shows the cross-section of a sealing top put on a can;

FIG. 2 a part of a sealing top cross-section in the "Open"-position of the slider valve, and FIG. 3 the same cross-sectional as in FIG. 2 with the outlet channel closed.

FIGS. 1 thru 3 are described together as shown in these drawings a sealing top 1 is setup on the opening of a flexible container 2 shown as a can with a circular cross-section. The attaching means may be a toric ring arrangement 3 however other cross-sectional forms may be used. in the exemplary embodiment an inner cylinder 6 connected on one side to the cover plate 5 of sealing top 1 fits into the cylindrical neck 4 of container 3.

In this embodiment the outlet discharge channel 7 is connected into inner cylinder 6 through inner discharge channel 8. Channel 7 includes the narrower and shorter inner channel 8, and the wider and longer outer channel 9. Container interior 10 is connected to outer channel 9 by inner channel 8, while 9 leads to outlet opening 11 in the lateral outer wall 12 of sealing top 1.

In the area of outlet opening 11 a slider valve 13 is adjustably supported in bearing 15 perpendicular to the longitudinal direction 14 of outlet channel 7. The slider valve has a passage opening 16, which is contour-congruent with the cross-sectional area of flow of outer channel 9. By shifting slider valve 13 in the direction of arrows 17 the passage opening 16 can be made to register with outer channel 9. As shown in FIG. 2 discharge channel 7 then is open. To avoid complete pullout of slider valve 13 and possible loss of said slider valve its lower end is fitted with a stop 18, which on pulling out slider valve 13 hits a limit stop 19. A similar stop 20 may be provided at the outer end of slider valve 13 in order to facilitate pulling out of slider valve 13 and to open the seal. The slider valve 13 is preferably mounted to slide vertically according to arrows 17 but it can be mounted to slide horizontally with reference to the vertical axis of the container 2 if desired.

Upon opening discharge channel 7 as shown in FIG. 2 the container contents can be discharged through inner channel 8 into outer channel 9 and through outlet opening 16 of slider valve 13, by means of pressure exerted on the flexible container 2. Because the cross-sectional area of discharge channel 7 increases along its length, i.e., the cross-sectional area of outlet 16 is greater than the cross-sectional area of inner channel 8, no clogging or arching occurs in the powder or granular material so that under normal conditions clogging of discharge channel 7 is impossible. The powder stream formed by inner channel 8, aligned with outer channel 9 facilitates a targeted application of the discharged product. In a specific embodiment, the length of inner channel 8 will be about 1 mm maximum, while the length and diameter of outer channel 9 will be between 6 and 8 mm.

As slider valve 13 is located immediately adjacent outlet opening 11 of discharge channel 7, any residue products in outer channel 9 are returned into the interior of the seal on closing the slider valve and there is no substantial scattering of container contents after closure of the discharge openings. This is of particular advantage with container contents of a corroding product type such as toilet cleansers.

Preferably discharge channel 7 has a round specifically circular cross-sectional opening area. As shown in the exemplary embodiment the outer channel 9 is a straight continuation of inner channel 8 which prevents any obstruction or clogging of these channels on discharge of the container contents.

We claim:

1. A seal for a container for powders or granular products having a non-clogging lockable opening for the selective dispensing of the container contents by pressure exerted on the container characterized in that said seal is provided with an opening terminating in a lock, said opening comprising a substantially uniform inner channel and a substantially uniform outer channel, both of said channels being aligned in the direction of discharge and in a direction perpendicular to the longitudinal axis of the container, said outer channel extending from the inner channel outward and the cross-sectional area and the length of the inner channel each being small relative to the cross-sectional area and the length of the outer channel, the cross-section-to-length ratio of the outer channel being at least 3:4, and said lock blocking the outer channel of said opening, said lock comprising a slider valve movable perpendicularly to the longitudinal direction of discharge.

2. The seal according to claim 1, characterized in that the outlet of the outer channel has a circular opening cross-section.

3. The seal according to claim 1, characterized in that said slider valve is equipped with a porthole having the same contour as the cross-sectional area of the outer channel and which can be made to register with the latter.

4. The seal according to claim 1, characterized in that said slider valve is movably supported in a slider bearing provided on the outside of the outer channel and that at least one stop for insuring against loss of said slider is provided at one or both of the slider ends.

5. The seal according to claim 1, characterized in that said opening terminates at the exterior surface of the seal.

6. A seal for a container for powders or granular products having a non-clogging lockable opening for the selective dispensing of the container contents by pressure exerted on the container characterized in that that said seal is provided with an opening terminating in a lock, said opening comprising a substantially uniform inner channel and a substantially uniform outer channel, both of said channels being aligned in the direction of discharge and in a direction perpendicular to the longitudinal axis of the container, said outer channel extending from the inner channel outward and the cross-sectional area and the length of the inner channel each being small relative to the cross-sectional area and the length of the outer channel, the cross-section-to-length ratio of the outer channel being at least 3:4, and said lock blocking the outer channel of said opening, said lock comprising a slider valve movable perpendicularly to the longitudinal direction of discharge, said slider valve being equipped with a porthole having the same contour as the cross-sectional area of the outer channel and which can be made to register with the outer channel and being movably supported in a slider bearing provided on the outside of the outer channel, at least one stop for insuring against loss of said slider being provided at one or both of the slider ends.

* * * * *

UNITED STATES PATENT AND TRADEMARK OFFICE

CERTIFICATE OF CORRECTION

PATENT NO. : 4,541,551

DATED : September 17, 1985

INVENTOR(S) : PETER VIERKÖTTER et al.

It is certified that error appears in the above-identified patent and that said Letters Patent is hereby corrected as shown below:

Column 1, line 58, "a" should read -- of a --.

Signed and Sealed this

*Third* Day of *December 1985*

[SEAL]

*Attest:*

DONALD J. QUIGG

*Attesting Officer* *Commissioner of Patents and Trademarks*